2,975,835

BACTERIOLOGICAL METHOD OF OIL RECOVERY

Donald C. Bond, Crystal Lake, Ill., assignor to The Pure Oil Company, Chicago, Ill., a corporation of Ohio No Drawing. Filed Nov. 7, 1957, Ser. No. 694,927

5 Claims. (Cl. 166—42)

This invention relates to a method for recovering oil from subterranean formations, and more particularly to a method for utilizing oil-releasing bacteria to effect additional recovery of oil from formations in which the oil is contained.

It is known that certain species of bacteria have the ability to feed on hydrocarbons, reducing the molecular weight and viscosity, while at the same time producing carbon dioxide which helps to displace the oil of reduced viscosity from the pores of the producing formation. The action of such bacteria is disclosed in U.S. Patents Nos. 2,413,278 and 2,660,550.

Attempts to utilize bacteria of this type to increase the flow of oil in formations of low permeability have not met with success. The bacteria are of a filterable variety and, as a result, not only do not reach the portions of the formation remote from the earth bore, but serve to seal off the reservoir by being filtered out on the face of the earth bore and the formation immediately surrounding it.

I have discovered that formations of low permeability can be effectively subjected to bactericidal treatment by forcing a medium containing the bacteria into the formation under pressure sufficiently high to cause fracturing of the formation. The fracturing medium containing the bacteria is then able to pass through the fractures into the producing reservoir and is allowed to remain there for a sufficient period of time to act on the oil and release it from the formation pores.

An object of the invention is to provide a method for increasing production of mineral oil from underground reservoirs. Another object of the invention is to provide a method for simultaneously fracturing a subterranean producing formation and injecting hydrocarbon-releasing bacteria into the formation. A further object of the invention is to provide a method for effectively injecting and distributing oil-releasing bacteria into an oil-containing reservoir. Other objects of the invention will manifest themselves from the following description.

In carrying out the invention, oil-releasing bacteria, particularly those from the genus Desulfovibrio, including *Desulfovibrio hydrocarbonoclasticus* and *Desulfovibrio halohydrocarbonoclasticus*, are incorporated in a suitable growth medium. Other bacteria which are useful are *Aspergillus flavus*, *Bacillus methanicus*, and *Bacillus ethanicus*. A suitable growth medium for the bacteria is one having the composition:

| | | |
|---|---|---|
| Calcium or sodium lactate | grams | 3.5 |
| Ascorbic acid | do | 0.5 |
| Yeast extract | do | 1.0 |
| Magnesium sulfate | do | 0.2 |
| Dipotassium acid phosphate | do | 0.5 |
| Sodium chloride | do | 10.0 |
| Distilled water | cc | 1000.0 |

The growth medium either before or after inoculation with bacteria is thickened with a suitable aqueous gelling agent of the type used in conventional well-fracturing operation. These agents include water-dispersible gums, agar-agar, gelatin and carboxymethylcellulose, and may be added in amounts of about 1–5% to obtain a gel of the desired viscosity. Where temperatures greater than about 130–140° F. are required to disperse the thickening or gelling agent in water, the thickening agent is added prior to inoculation with the bacteria and thereafter cooled below about 130° F. to avoid destroying the bacteria.

The gel medium containing the growing bacteria is injected into the oil-producing formation using standard well-fracturing techniques. It will be understood, of course, that propping agents, such as sand or gravel, may be added to the gelled medium in accordance with practice commonly followed in fracturing formations. It may be desirable prior to injection of the fracturing medium to clean the well by swabbing or pumping. About 1,000–10,000 gallons of the fracturing medium containing the growing bacteria is usually sufficient to obtain a substantial increase in oil production. However, if the oil-bearing sand is of substantial thickness, that is, of the order of 50–250 ft., greater volumes of the fracturing medium may be required. If the formation to be treated is at the bottom of the well, a packer may be positioned in the well at the top of the producing formation to isolate it from the remainder of the well bore, and the gel medium pumped down the tubing. Where the zone to be treated is intermediate between the top and bottom of the bore, packers may be placed at the bottom and top of the producing formation to isolate it from the rest of the bore and insure that the fracturing medium will be injected into the desired zone.

After the fracturing medium containing the growing bacteria is injected into the well and located opposite the formation desired to be fractured, sufficient pressure is applied in order to fracture the oil-bearing rock. The pressure required is usually about 0.7 p.s.i. (measured at the rock face) per foot of overburden and may vary from 0.6 to 1 p.s.i. for each foot of overburden, i.e., for each foot of depth from the surface to the formation to be fractured.

After the rock is fractured, as indicated by a sharp drop in pressure at the surface, injection of gelled medium is continued until the desired volume has been introduced. The well is then shut in for a period of about one month to a year to allow the bacteria to grow and induce oil flow. At the end of the desired period, normal production operations are resumed.

As a specific example of the invention, a sandstone well drilled to a depth of 3,000 ft., and having an oil-bearing interval 20 ft. thick, produces at a rate of 15 barrels per day. Tests on this well and other wells in the same formation show that the rate of production is unchanged by shutting in the wells, and that conventional fracturing on other wells in the same formation have little or no effect on production rate. Five thousand gallons of a fracturing medium prepared by inoculating the composition having the formula hereinabove set forth with *Desulfovibrio hydrocarbonoclasticus*, and containing 2% by weight of agar-agar as a gelling medium, is injected into the well and formation. A packer is placed immediately above the oil-bearing interval and approximately 400 gallons of gel is injected into the tubing in order to fill the tubing and the space immediately adjacent to the producing formation. A pressure of 900 p.s.i. is applied to the gel at the surface in order to fracture the rock. Upon fracturing, the surface pressure drops to 100 p.s.i. and the remaining portion of the gel is injected. After completion of the injection, the well is shut in for three months, and then normal production operations resume. This procedure increases the production rate to 25 barrels per day.

Instead of using an aqueous fracturing liquid, the bacteria-growth-supporting composition may be emulsified in a suitable hydrocarbon oil to which has been added suitable thickening and emulsifying agents, such as the aluminum soaps of naphthenic and oleic acids, as disclosed in Reissue Patent No. 23,733, and the emulsion injected in a conventional manner to produce fracturing of the formation and penetration of the formation by the oil-releasing bacteria. If this type of fracturing medium is used, care should be exercised not to use gelling and/or emulsifying agents which are harmful to the bacteria.

It will be seen that I have succeeded in devising a method for simultaneously fracturing a producing formation and at the same time injecting oil-releasing bacteria into the formation so that the bacteria will release the oil and produce it through the fractures formed.

I claim as my invention:

1. The method of increasing production of hydrocarbon fluid from a rock formation containing such fluid comprising forcing into said formation through a well a fracturing medium, together with oil-releasing bacteria of the group consisting of the genus Desulfovibrio, *Aspergillus flavus*, *Bacillus methanicus*, and *Bacillus ethanicus* and a nutrient therefor, under pressure sufficient to fracture said formation, shutting in said well for a period of about 1 to 12 months to enable said bacteria to act upon said hydrocarbon fluid, and then producing said hydrocarbon fluid from said well.

2. Method in accordance with claim 1 in which the fracturing medium is an aqueous medium thickened with a water-dispersible thickening agent.

3. Method in accordance with claim 2 in which the combined fracturing medium and nutrient is a water solution of a nutrient composition thickened with about 1–5% by weight of a water-dispersible thickening agent selected from the group consisting of gums, agar-agar, gelatin and carboxymethylcellulose.

4. A method of recovering mineral oil from an underground rock reservoir comprising injecting through a well bore and into said reservoir from 1,000–10,000 gallons of a thickened aqueous solution of a nutrient for bacteria of the genus Desulfovibrio which has been inoculated with live bacteria from the genus Desulfovibrio, exerting sufficient pressure on said thickened solution to fracture the rock wall in contact with said solution, forcing said solution into the reservoir, shutting in said well for a period of about 1 to 12 months and then producing oil from said well.

5. Method in accordance with claim 4 in which said aqueous solution is thickened with about 2% of agar-agar.

References Cited in the file of this patent

UNITED STATES PATENTS

| | | |
|---|---|---|
| 2,651,500 | Teichmann | Sept. 8, 1953 |
| 2,660,550 | Updegraff | Nov. 24, 1953 |
| 2,681,704 | Menaul | June 22, 1954 |
| 2,801,218 | Menaul | July 30, 1957 |

OTHER REFERENCES

Coulter: Chemical Additives, Production Sec. World, Oil, Feb. 1, 1957, pp. 148, 149, 152, 157 and 158 at page 152.